INVENTORS
John D. Harper
Frederick Breyer
Richard C. Wagner
BY Drewler, Goldsmith, Clement, Gordon & Ladd
ATTORNEYS

United States Patent Office 3,431,745
Patented Mar. 11, 1969

3,431,745
LIQUID NITROGEN FLASH FREEZING
John D. Harper, Elgin, Frederick Breyer, Highland Park, and Richard C. Wagner, Clarendon Hills, Ill., assignors to Integral Process Systems, Inc., a corporation of Illinois
Filed Sept. 15, 1965, Ser. No. 487,359
U.S. Cl. 62—63       26 Claims
Int. Cl. F25d 13/06, 17/02, 17/06

ABSTRACT OF THE DISCLOSURE

Cryogenic flash freezing apparatus is disclosed having vacuum insulated outer and inner shells defining a main process chamber equipped with a downstream pressure fed cryogenic liquid spray discharge system having nozzles above and below the article path and spanning about ⅓ of the length of the chamber and equipped with an upstream high velocity gas circulation system acting along the remainder of the process chamber. The liquid spray discharge impinges on the articles at a mass flow rate greater than the mass rate of liquid vaporization and the excess liquid is collected, repressurized and resprayed. Make-up liquid is added directly within the chamber. All external connections are made through separately insulated end spools on the shells.

---

This invention relates to a method and apparatus for freezing both food and non-food products by the use of the latent heat of vaporization of liquid nitrogen and the specific heat of ultra-cold nitrogen gas. The application of the instant invention is particularly directed to the flash freezing of foods, which is by way of example only.

The present freezing methods, including blast freezing and immersion freezing techniques, are subject to many disadvantages including inefficiency of operation, length of time required to satisfactorily freeze the products, and the cost factor. In addition, the present methods are limited as to the amount of product that can be frozen in any given time period. A contributing factor to the reduction in efficiency is the lack of adequate insulation to permit maximum utilization of the fluid being used as the cooling medium. Heretofore, conventional insulating techniques have not been completely satisfactory and have substantially added to the cost of the coolant used.

Other problems encountered when employing the "blast freezing" method include the change in crystalline structure and the disturbance of the quality of the food product.

It can be appreciated that a system whereby food products can be instantaneously frozen in a continuous process at a price that would be economically feasible would be a boon, both to the food processor and the consumer who would like to have food products always available regardless of the season of the year.

In accordance with the present invention, there is provided a method and apparatus for the efficient and economical "instant freezing" of various products including those frozen foods presently available on the market. Other products would include meat, poultry, sea food, bakery products, and prepared foods. Examples of other uses for which the process may be utilized include the shrink fitting of bearings and the stress relieving of aluminum castings.

The method of this invention in one aspect thereof involves flash freezing of articles in a substantially thermally isolated chamber and includes the steps of transporting the articles along a process path into, through and out of said chamber, directing a cryogenic liquid spray discharge on each article to flash partly to gas, collecting excess liquid from the discharge and supplementing the same with make-up liquid to replace the liquid flashing to gas, recirculating the liquid nitrogen to support the spray discharge and drawing off gaseous nitrogen from the chamber and returning the same to the chamber in the form of a high velocity stream directed along a recirculation flow path to impinge upon articles when at another region along the flow path.

The method utilizes the latent heat of vaporization for the final freezing phase, and first precools with high velocity gaseous nitrogen in preparation for the final freezing phase. The gaseous nitrogen is presented in two stages, the first involving a transverse gas stream at about −100° F. and the second involving an oppositely directed transverse gas stream at about −200° F.

A flash freezer embodiment is disclosed herein wherein a vacuum is maintained in an annular zone defined between inner and outer shells. The outer shell has a flexible joint intermediately therealong and is connected to the ends of the inner shell to follow thermally induced lengthwise contractions and expansions of the inner shell. Insulated end spools are mounted on the shells and arranged to receive all external connections to the equipment.

Facilities for recirculating liquid are located externally and extend through one of the insulated end spools. Facilities for recirculating cold gas are also located externally and extend through the insulated end spools.

Internal support structure is removable endwise from the process chamber to facilitate construction, assembly and maintenance. This support structure mounts plenum chambers for the gas recirculation system the plenum chambers being arranged for quick connection to gas outlets and inlets provided in the end spools. A main open mesh conveyor is mounted on the removable support structure and liquid supply headers and nozzles are mounted to spray through the conveyor.

Inlet and outlet tunnels lead to and from opposite ends of the conveyor and are themselves equipped with conveyors for advancing the articles to be treated. Each of these tunnels is subjected to a gradual exfiltration of gaseous nitrogen to effect desirable pre-freezing and post freezing cooling treatments.

Other features and advantages of the invention will be apparent from the following description and claims, and are illustrated in the accompanying drawings which show an illustrative embodiment of the present invention.

In the accompanying drawings forming a part of the specification, and in which like numerals are employed to designate like parts throughout the same.

Figure 1:
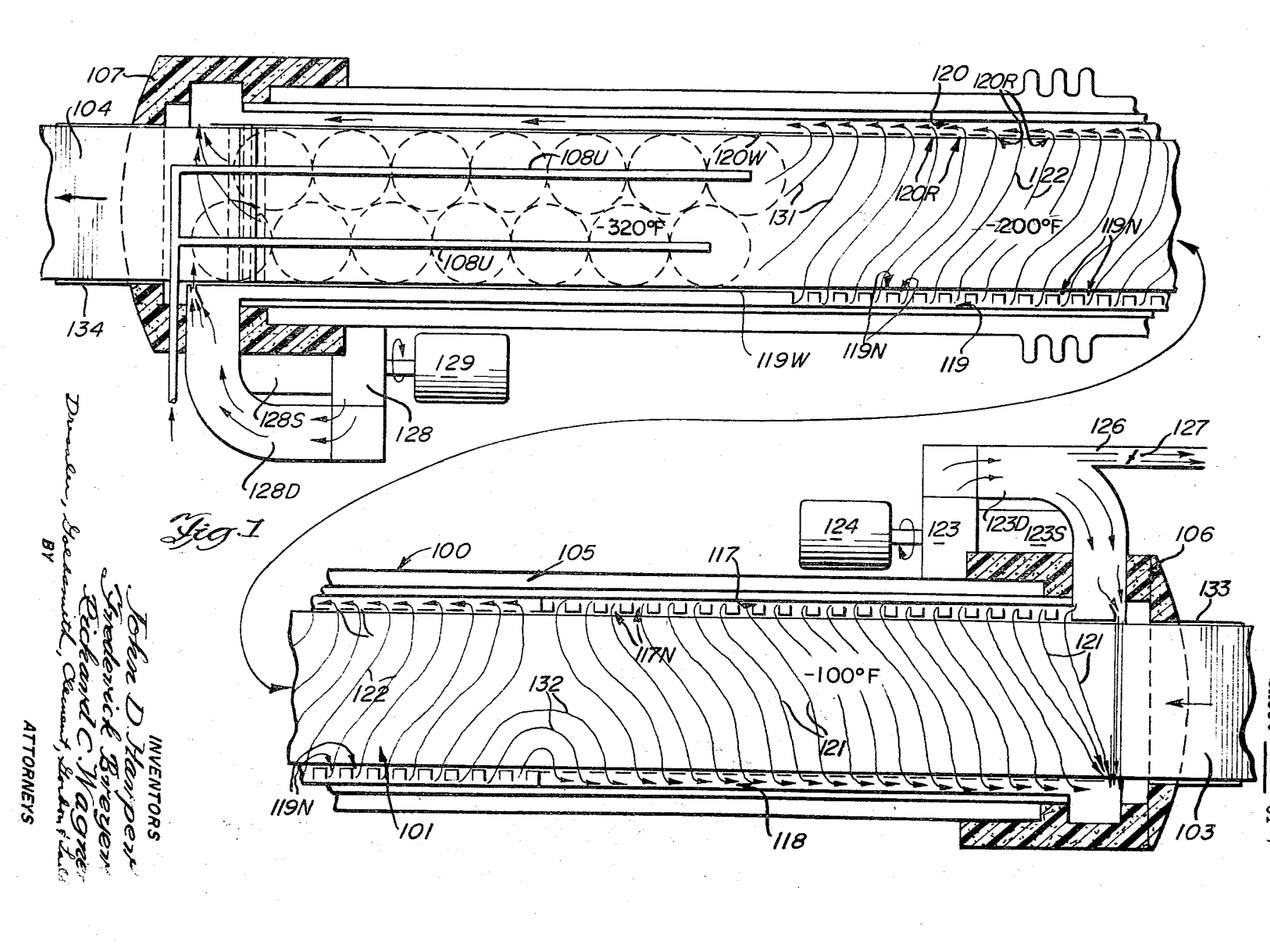
FIG. 1 is a diagrammatic plan sectional view through the complete apparatus.
Figures 2, 3:
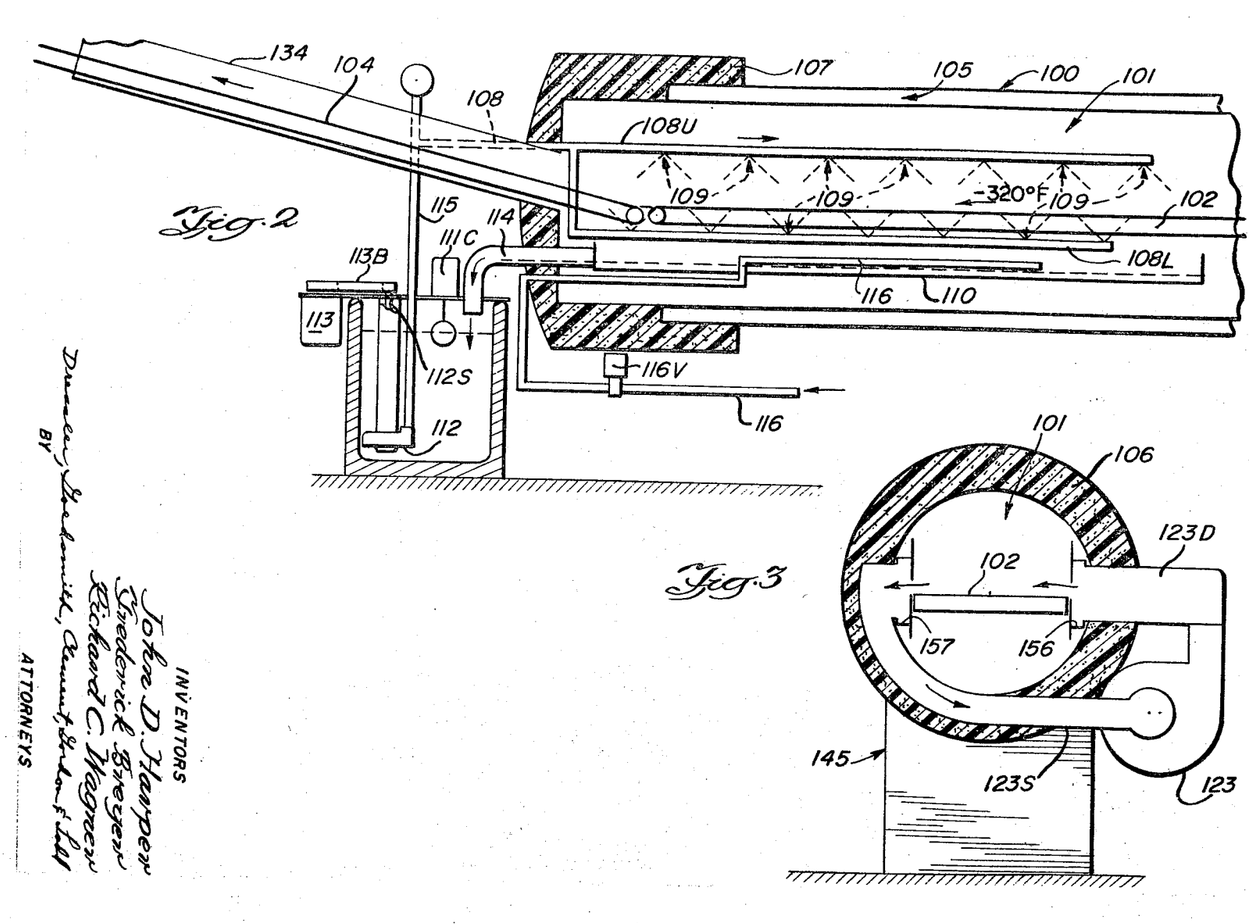
FIG. 2 is a fragmentary lengthwise section through the downstream end of the apparatus.
FIG. 3 is a transverse section through the inlet end spool of the process chamber structure.
Figure 4:
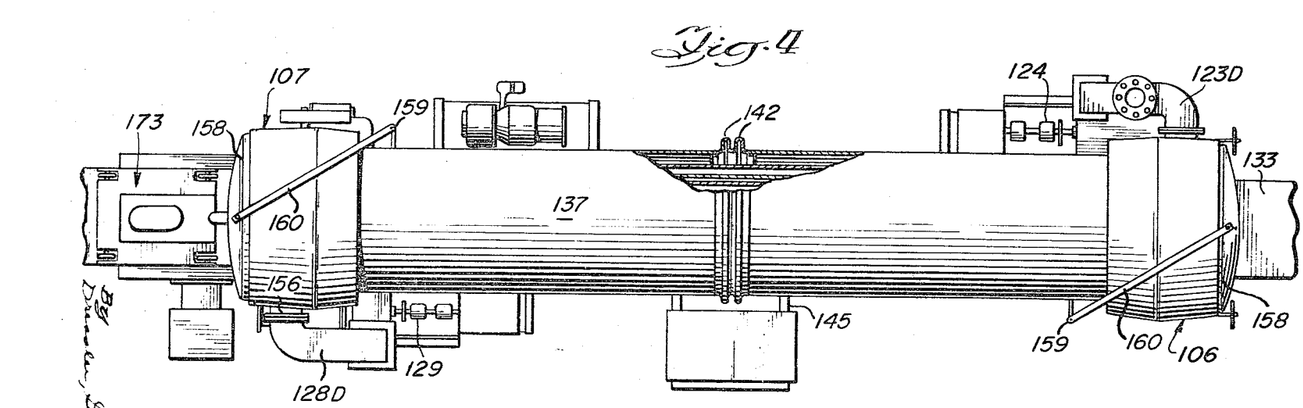
FIG. 4 is a plan view of the entire apparatus.

A flash freezing liquid nitrogen system together with typical flow rates and temperatures is provided in diagrammatic FIGS. 1 to 3 for purposes of illustrative disclosure. More structural features of the system are shown in greater detail in FIGS. 4 to 17.

Referring now particularly to the diagrammatic views of FIGS. 1 to 3, the system includes hollow housing structure 100 defining a substantially thermally isolated process chamber 101 having a conveyor 102 extending substantially full length therein and operating at a predetermined speed to advance products along a process path that leads through the process chamber in a direction from right to left as viewed in FIG. 1. An in line entrance conveyor 103 is shown leading into the process chamber at the right in FIG. 1 and an in line exit conveyor 104 is shown leading from the process chamber at the left in FIGS. 2 and 3. The housing structure 100 is configured to present an annular insulation space 105 completely encircling the process chamber and normally maintained at a vacuum level of less than 10 microns of mercury.

At the product infeed end, the housing structure is terminated in an insulated entrance spool 106 having a restricted mouth through which the entrance conveyor 103 extends and at the product delivery end, the housing structure is terminated in an insulated exit spool 107 having a restricted mouth through which the exit conveyor 104 extends.

Spray discharge mechanism, as provided in this embodiment, includes a cryogenic liquid supply line 108 feeding an upper pair of headers 108U and a lower pair of headers 108L arranged adjacent the downstream end of the process chamber and occupying about ⅓ of the length of the process chamber. A set of seven spray nozzles 109 (see FIG. 17) are shown on each header, each issuing a wide angle hollow cone, solid, or fan spray discharge. The precise number of nozzles per header can be varied depending upon the product to be frozen. The nozzles associated with the upper headers 108U are directed vertically downwardly and the nozzles associated with the lower header 108L are directly vertically upwardly. The spray patterns as shown in FIGS. 1 and 2 are in a staggered alternating close fit relation to span the entire width of the conveyor and progressively deposit atomized liquid droplets substantially uniformly against both the top and bottom faces of the articles. The conveyor 102 is of open mesh construction enabling necessary flowthrough for the upwardly directed nozzles associated with the bottom header. One of the features of the arrangement is the use of mass flow rates of cryogenic liquid substantially in excess of the mass rate at which liquid flashes to nitrogen within the chamber. The excess liquid emitted by the spray discharge is collected in a pan-shaped reservoir or tray 110 which underlies the conveyor 102 and the headers 108U and 108L adjacent the downstream end of the process chamber.

An arrangement for recirculating excess liquid to sustain the prescribed higher spray discharge rate is provided externally and includes a Dewar 111 or other vacuum insulated vessel providing a sump for cryogenic liquid, a cryogenic pump 112 suspended in submerged relation in the cryogenic liquid in the Dewar, a drive motor 113 mounted externally of the Dewar and having a drive belt 113B connected to the exposed upper end of the pump drive shaft 112S. The pump 112 is illustrated as being of a centrifugal type and further particulars of its arrangement and construction are provided in a co-pending application entitled Cryogenic Pump, Ser. No. 479,825, filed Aug. 16, 1965, in the name of Richard C. Wagner. The disclosure of said application is specifically incorporated herein by this reference.

To complete the liquid recirculation system, a drain line 114 leads from the collector pan 110 to the sump to return unused cryogenic liquid and a delivery line 115 leads from the discharge side of the pump and connects to the supply line 108 to the headers. The amount of liquid flashing to gas is related to the product flow rate through the process chamber and this amount must be constantly made up in order to sustain the spray discharge flow rate. A line 116 is shown which leads from a cryogenic liquid supply tank (not shown) exterior to the system, the line 116 having a solenoid control valve 116V and extending through the exit spool 107 to open directly into the collector pan 110 for supplying the make up liquid. Since the pressure at this external source and acting in the line 116 normally is greater than the pressure acting on the headers, the release of the make up liquid is accompanied by more pronounced flashing to vapor. The latent energy release associated with the pressure transition at the point of liquid release and evidenced by direct flashing to vapor it utilized in the present arrangement by connecting the make up line 116 to empty at a point directly within the process chamber.

The process chamber 101 is shown provided with internal housing structure to define a first set of opposed transversely spaced high pressure and low pressure plenum chambers 117 and 118, respectively, adjacent and flanking the process path along the upstream end of the process chamber and a second set of opposed transversely spaced high pressure and low pressure plenum chambers 119 and 120, respectively, adjacent and flanking the process path along an intermediate region of the process chamber. In the case of the upstream set, the high pressure chamber 117 is provided with an array of individually mounted control nozzles, as represented at 117N, and the low pressure chamber 118 is provided with a corresponding array of receiver openings 118R collectively to define a gas recirculation flow path that is oriented substantially transversely of the upstream end of the process path as represented by the flow arrows 121. Correspondingly, the high pressure chamber 119 of the intermediate set is provided with an array of individually mounted control nozzles, as represented at 119N, and the low pressure chamber 120 is provided with a corresponding array of receiver openings 120R which define a gas recirculation flow path also oriented approximately transversely of the process path but moving in an opposite side to side direction, as represented by the flow arrows 122, to provide impingement against an opposite region of the articles as they progress along the process path.

A gas recirculation system is associated with the entrance spool 106 and includes an externally mounted fan 123 powered by a drive motor 124 and having a discharge conduit 123D extending laterally through the wall of the spool immediately adjacent the end of the hollow housing structure 100 and a suction conduit 123S which, as best shown in FIG. 3, extends partway internally of the spool 106 and emerges laterally at a lower elevation. It will be noted that the discharge conduit 123D from this gaseous recirculation system branches to feed an exhaust conduit 126 that is equipped with a damper type control valve 127 to relate the rate of release of exhaust gas to the rate at which liquid flashes to gas within the process chamber for maintaining desired temperature and pressure balance within the system. In the disclosed arrangement, the process chamber is maintained substantially at atmospheric pressure and the control of the exhaust rate may be accomplished either by regulating with pressure as a reference, though this requires unduly sensitive equipment, or by regulating with temperature as a reference.

A corresponding gas recirculation system is provided at the discharge end of the process chamber and includes an externally mounted recirculation fan 128 powered by a drive motor 129 with the fan having its discharge conduit 128D entering laterally through the exit spool 107 and having its suction conduit 128S arranged partly in the spool and exiting at a lower elevation.

The plenum chambers 119 and 120 which constitute the intermediate set have masked wall regions 119W and 120W flanking the liquid spray discharge area and opening into the exit spool 107 to communicate with the discharge and suction conduits from the fan 128. Similarly, the plenum chambers 117 and 118 of the upstream set open into the entrance spool 106 and communicate with the discharge and suction conduits of its recirculation fan 123.

A high velocity gaseous curtain is provided across the mouth of each spool 106 and 107 by arranging the opposite internal face portions of each spool with suitable opposed openings to effect a continuous gas flow pattern directed laterally adjacent to the mouth region. These curtains serve to exclude ambient atmosphere from the process chamber and they are particularly effective where the process chamber is operating at or near atmospheric pressure.

In the arrangement as shown in FIGS. 1 to 3, the fact that gaseous nitrogen is withdrawn upstream, through the exhaust conduit 126 at the inlet end, and the fact that fresh gaseous nitrogen is introduced downstream, by virtue of the liquid flashing to gas at this region, results in a temperature profile wherein heat exchange between the cryogenic fluid and the product is optimized. In general, arrows 131 adjacent the upstream end of the spray discharge pattern and indicate the manner in which the freshly released gas joins in the transverse flow pattern developed by the intermediate set of plenum chambers 119 and 120. Arrows 132 bridge the high pressure chamber 119 of the intermediate set with the low pressure chamber 118 of the upstream set so that there is a gradual transfer of gaseous nitrogen towards the upstream end of the process chamber.

Optimum heat transfer is effected because the product, when at its warmest state, is exposed to gas at its warmest state within the system; the product when partially cooled is exposed to colder gas; and the product when further cooled is exposed to cryogenic liquid to complete the process.

For purposes of illustrative disclosure, typical values are given for operating the flash freezer apparatus in a practical application involving flash freezing of bakery goods at a rate of 2500 lbs. per hour. The delivery line 115 from the cryogenic pump 112 handles a rated flow of 5100 lbs. per hour of cryogenic liquid supplied at a pressure of 6 p.s.i. to be spray discharged in distinct wide angle spray patterns by the precision nozzles 109 which, by way of example, may have a 1/8" diameter orifice and be of the type identified as No. 18B5–5W of Spraying Systems Co.

For bakery goods, the system utilizes about one pound of liquid nitrogen for each pound of product. In the example, 2500 pounds of product are processed per hour so liquid flashes to gas at the spray discharge region at a rate of about 2500 pounds per hour. The excess is collected in the tray 110 and is drained back to the sump provided by the external Dewar 111. Fresh liquid nitrogen is supplied through the make up line 116 which enters through the exit spool 107 and opens directly into the tray 110. The average rate of make up liquid entry is therefore 2500 pounds per hour, and this liquid also drains into the sump after its release at a point within the chamber.

The temperature of the entering cryogenic liquid is about −320° F. The flow volume of the gas recirculation stream between the intermediate set of plenum chambers 119 and 120 is about 1000 cubic feet per minute and the gas temperature is about −200° F. The gas recirculation fan 123 for the upstream set of plenum chambers 117 and 118 also has a flow volume of 1000 cubic feet per minute and at this region the gas is at a temperature of −100° F. A typical value for the drawoff through the exhaust conduit 126 is about 390 cubic feet per minute at a temperature of −100° F. The stream velocity across the intermediate set of plenum chambers is 3000 feet per minute and the stream velocity across the upstream set of plenum chambers is somewhat less. The total mass flow rate of the gas in these transverse flow streams is substantially greater than the mass rate of liquid flashing to gas in the chamber.

The high volume, high velocity gas recirculation creates turbulence at the surface of the product or article and effects better heat transfer. Transverse flow is more efficient as it is easier to achieve high volume and high velocity and it affords a better angle of impingement upon the product.

In the disclosed embodiment, liquid nitrogen is pumped to the spray headers 108U and 108L in a saturated liquid state (all liquid and no gas); the amount of liquid nitrogen sprayed on the product is in excess (two to three times as much) of what is actually required to freeze the product; and the excess amount is collected and recirculated back to the spray headers. The spray technique used progressively and repeatedly wipes the surface of the product with liquid nitrogen droplets to promote rapid heat transfer. The gas generated on the surface of the product in the freezing process is penetrated by the liquid nitrogen droplets which leave the spray nozzles with adequate velocity for this purpose.

An accurate metering of liquid nitrogen to the system is not required. The liquid nitrogen level in the exterior sump provided by the Dewar 111 is controlled by a simple on-off liquid level controller 111C. As liquid nitrogen is consumed in the freezing process, the level of liquid in the sump will drop and additional liquid is added to the system. Without a liquid recirculating system such as disclosed herein, the precise amount of liquid nitrogen must be added to perform the freezing operation. If an excess is added, inefficient operaiton will result. If too littled is added, the product will not be properly frozen. The progressively deposited full coverage high velocity spray technique results in very rapid heat transfer between the product and the liquid nitrogen. This results in high production for a relatively small unit. Since the heat transfer loss from a freezer unit to the surrounding atmosphere is a relatively fixed amount for a given size unit, the unit with the higher production rate can prorate this loss over a larger amount of product processed.

The entrance and exit conveyors 103 and 104 are housed in insulated ducting providing an entrance tunnel 133 and an exit tunnel 134. Each of these tunnels angles upwardly in a direction away from the process chamber and is maintained filled with cold gaseous nitrogen (which is much denser than ambient air). The process chamber is operated at slightly greater than atmosphere pressure to promote flow or exfiltration of gaseous nitrogen outwardly through each tunnel. This exfiltration is arranged effectively to exclude entry of ambient air and also provides pre-cooling in the case of the entrance tunnel 133 and post-cooling in the case of the exit tunnel 134. The product which has just been deeply frozen by the liquid nitrogen at the downstream end of the process chamber 101 may achieve thermal equilibration during the post-cooling process in the exit tunnel.

The nozzles 117N and 119N are individually rotatable structures to give some axial adjustment of the direction path of the recirculated gaseous stream. By proper adjustment of these nozzles, the exfiltration flows through the tunnels may be balanced or may be otherwise set up according to individual needs.

The structural features incorporated in the flash freezer apparatus are best disclosed in FIGS. 4 to 17, and reference may now be had to these figures for the following description.

Figure 5:
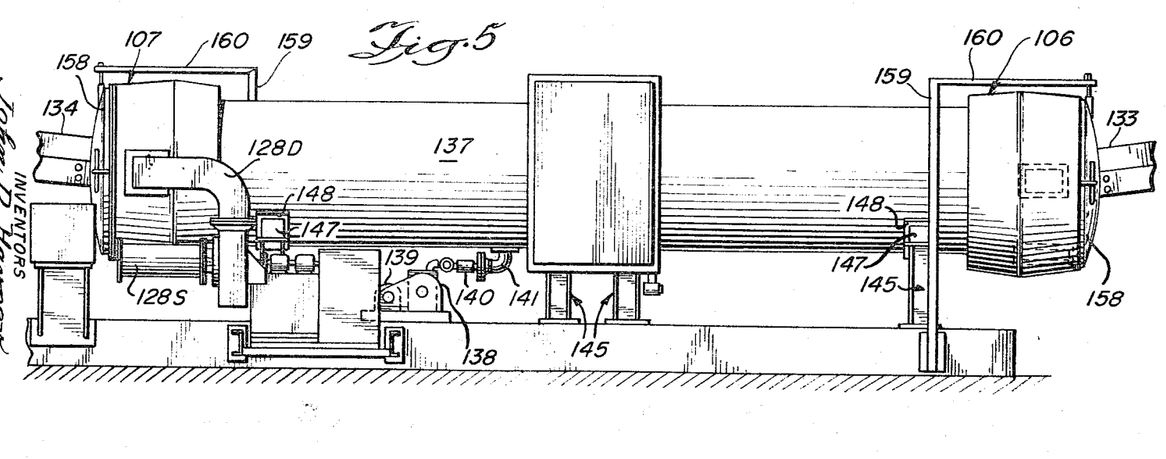
FIG. 5 is a side elevational view of the entire apparatus.

The hollow housing structure 100, which defines the process chamber 101 is comprised of substantially coextensive inner and outer shells 136 and 137, respectively, which are mounted in a spaced apart relation to define the annular insulation space 105 which is maintained at the prescribed vacuum by means of the vacuum pump 138 (FIG. 5). The vacuum pump 138 is powered by a motor 139 and has its suction line 140 connected through an elbow 141 which is mounted on the outer shell 137 to communicate with the vacuum space 105.

The inner shell 136 is a unitary, rigid, one piece structure and is subjected to the widest range of temperature extremes and undergoes contraction and expansion each time the unit is started up or turned down. The outer shell 137 consists of endwise aligned sections joined together at an intermediate point by an endless, flexible joint 142 and connected at opposite ends 137E (FIGS. 12 and 13) to corresponding ends 136E of the inner shell by means of an annular flange 143. Reinforcement rings 144 of right angled section are secured to each section of the outer shell 137 at axially spaced locations to rigidify it, with the inner radial extremities of the reinforcement rings 144 being spaced from the inner shell 136 to maintain the insulation effectiveness of the vacuum and to maintain the vacuum space 105 continuous and uninterrupted from end to end of the hollow housing structure 100. The entire arrangement of the flash freezer apparatus eliminates connections leading externally through the vacuum space 105, and this greatly contributes to the effectiveness of the insulation arrangement, and also avoids the difficult mechanical construction problems associated with the relative axial shifting that occurs between the inner and outer shells.

Figure 7:
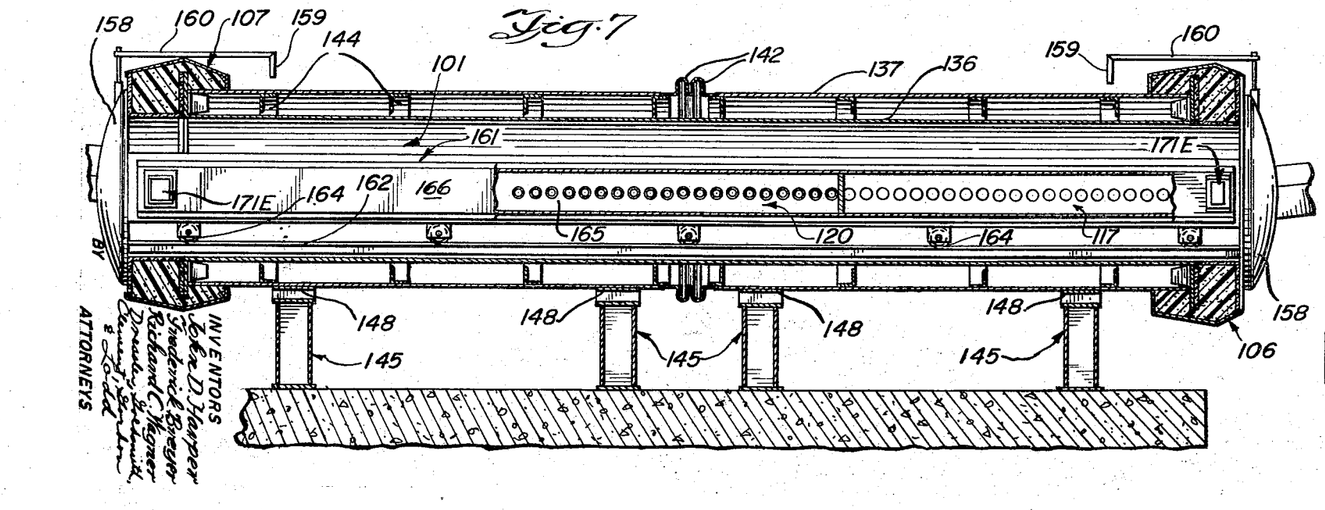
FIG. 7 is a lengthwise transverse sectional view of the entire apparatus.

As is apparent in FIGS. 5 and 7, a set of four stands 145 underlie the outer shell in axially spaced relationship, two for each end section. The details of these stands 145 are shown more clearly in FIGS 8 and 15 and each includes a floor-mounted base structure 146 having upstanding sides 146S, each equipped with an angle iron mounting bracket 147. The brackets 147 are in an opposed relationship to each other and jointly carry an arcuate support shoe 148 having an underslung supporting relation to the outer shell 137 and providing a broad faced support surface that facilitates the sliding movement of the outer shell as it follows changes in length of the inner shell occasioned by temperature effects.

Figure 12:
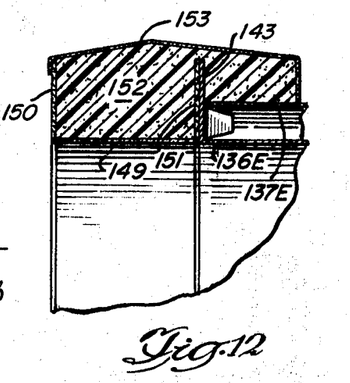
FIG. 12 is an enlarged fragmentary section through the end spool and is taken on the line 12—12 of FIG. 11.

The end spools 106 and 107 are essentially similar and each is comprised of skeletal metal framing including, as is best seen in FIG. 12, an internal sleeve 149 for endwise registry with the inner shell 136 and of the same diameter, and axially spaced outer and inner flanges 150 and 151. The skeletal framing constituted by the elements 149, 150 and 151 is insulated by encircling it with a thick packing of polyurethane foam 152, which extends radially beyond the flanges 143 and 151. These flanges 143 and 151 are interconnected for joining the spools to the hollow housing structure. The foam packing 152 is extended axially along the outer skin of the outer shell 137 to limit the temperature gradient at this region of the insulation system. The insulation foam is covered by an annular shell 153 of fiberglass and coated with a polyester.

Figure 11:
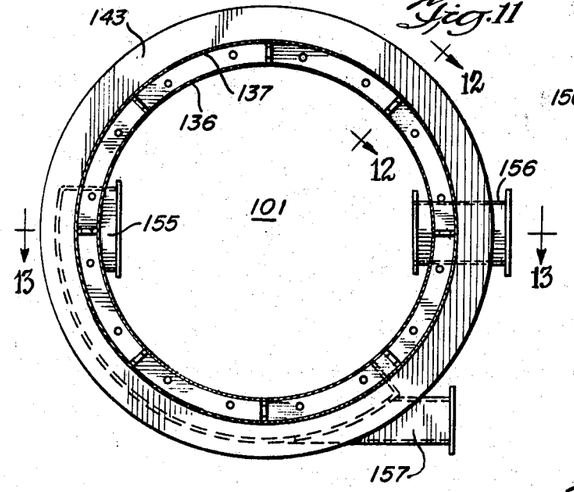
FIG. 11 is a transverse section taken on the line 11—11 of FIG. 10.
Figures 13, 14:
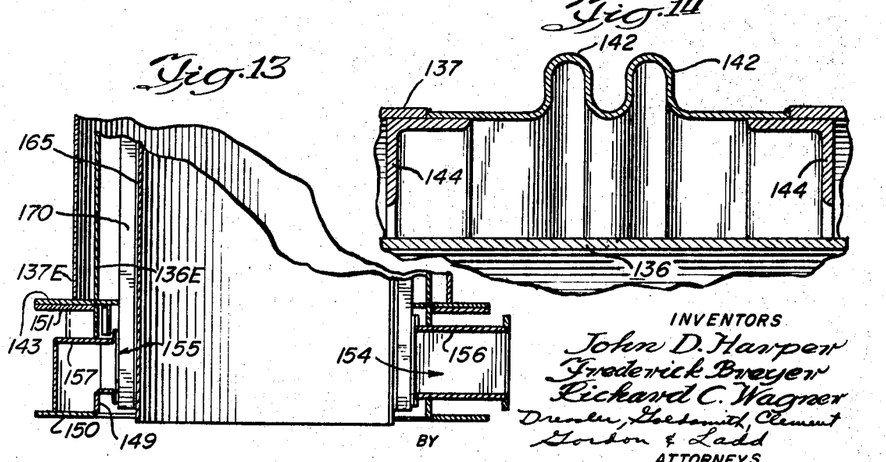
FIG. 13 is a related section through the spool and is taken as indicated on the line 13—13 of FIG. 11.
FIG. 14 is an enlarged fragmentary section of a flexible joint provided in the main housing.

As is best seen in FIGS. 3, 11 and 13, each of the spools has its sleeve 149 provided with diametrically opposed wall openings 154 and 155. Wall opening 154 mounts an adaptor duct 156, which serves as an extension of the pressure passage 123D or 128D of the corresponding gas recirculation system. Wall opening 155 has an adaptor duct 157 which leads arcuately around the spool within the confines of the layer of insulation 152 and emerges at a laterally lower elevation as an extension of the suction passage 123S or 128S of the corresponding gas recirculation system.

Finally, each of the end spools 106 and 107 receives an end closure cap 158 having a restricted central opening serving as the mouth of the spool. The end closure cap 158 is in each case insulated with a packing of polyurethane foam. The end caps are mounted from swing rods including vertical and horizontal sections 159 and 160 to enable convenient removal of the end cap for gaining access to the interior of the process chamber 101.

Removable support structure as designated generally at 161 in FIGS. 6 to 9 extends endwise in the process chamber 101. In the disclosed arrangement, the inner shell 136 is equipped with fixed lengthwise rails 162 interconnected by reinforcing bars 163 and providing trackways for flanged mounting wheels 164 carried on opposite underneath sides of the removable support structure 161. The removable support structure 161 includes upstanding side panels 165 and 166 extending substantially its full length and interconnected by a number of transverse bars 167.

Figure 8:
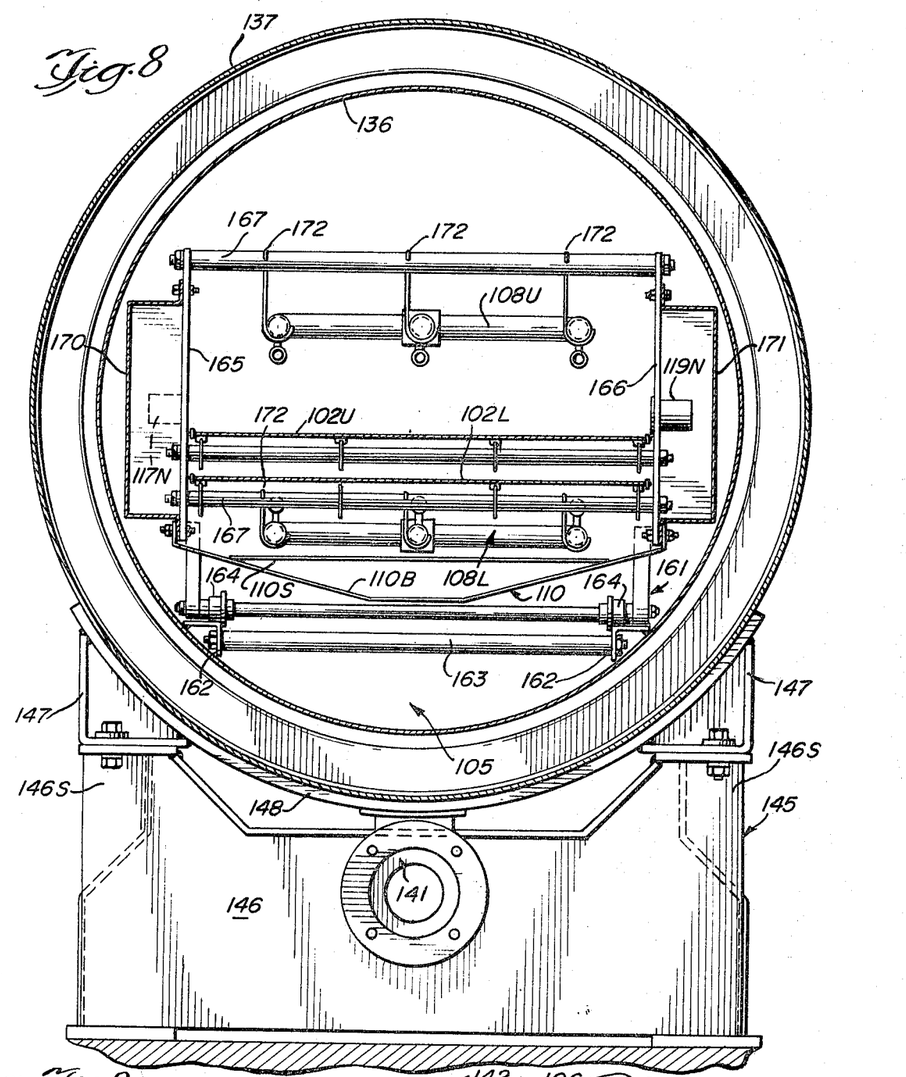
FIG. 8 is an enlarged transverse section better illustrating internally mounted removable support structure.
Figure 9:
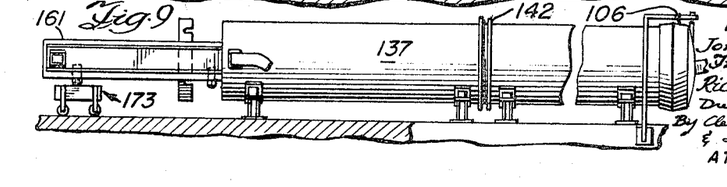
FIG. 9 is a diagrammatic side elevational view illustrating removal of the internal support structure.
Figure 10:
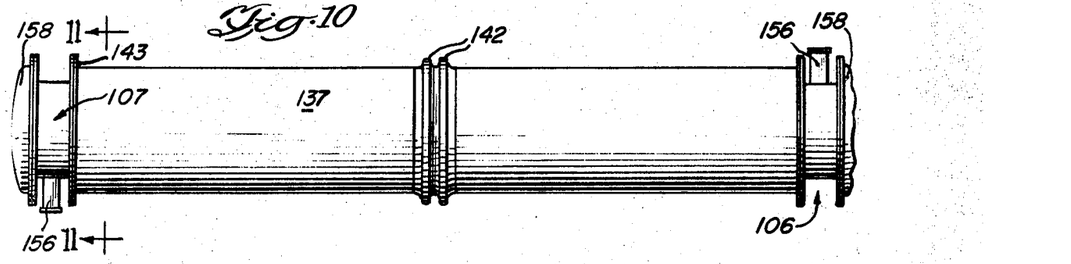
FIG. 10 is a plan view of the main shell and end spool framing at an intermediate stage of construction.

The collector tray 110 is best shown in FIG. 8. It includes a trough-shaped bottom 110B and a perforated splash shield 110S spaced thereabove. The main conveyor 102 has upper and lower reaches 102U and 102L, respectively, and is powered by a drive roller 168 at its downstream end and is trained about an idler roller 169 at its upstream end, with the conveyor being nested centrally in the removable support structure. Ducts 170 and 171 are mounted outward on the sidewalls 165 and 166 to define the plenum chambers 117 to 120, there being a vertical baffle 170B and 171B separating these chambers longitudinally.

Finally, in the detailed structural embodiment of FIGS. 4 to 17, a set of three upper headers 108U are shown equipped with nozzles 109 and a set of three lower headers 108L are shown equipped with nozzles 109, these headers being suspended by hooks 172 that are mounted to the transverse bars 167. A header 108U and nozzle 109 is shown in greater detail in FIG. 17.

Figure 6:
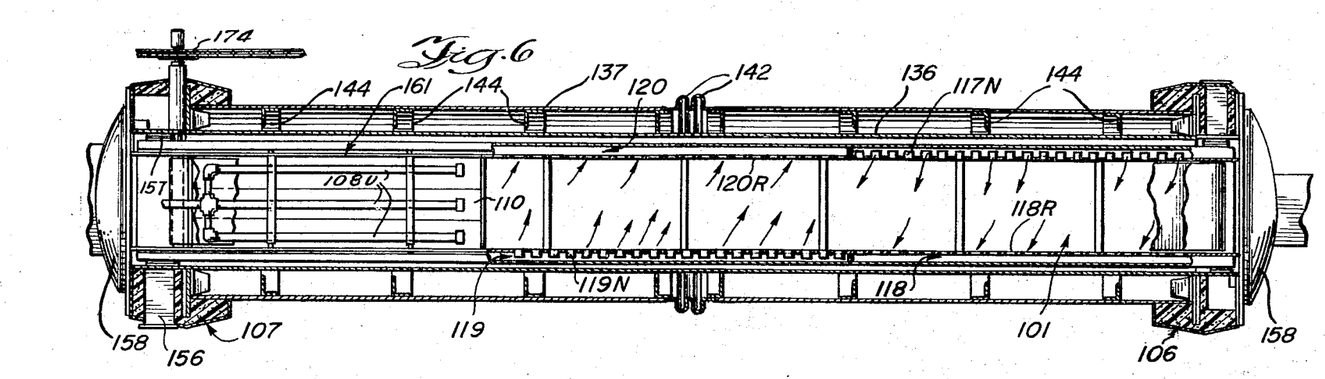
FIG. 6 is a plan sectional view of the entire apparatus.
Figures 15, 16, 17:
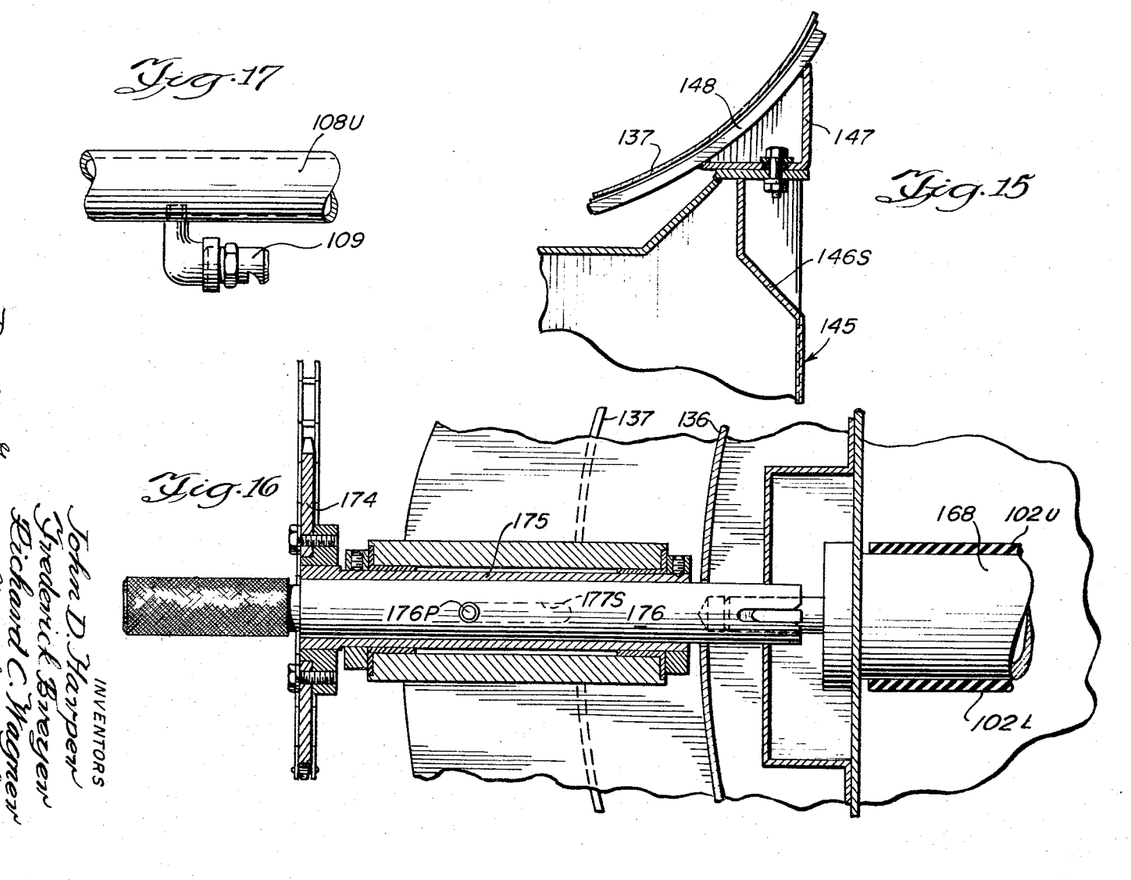
FIG. 15 is an enlarged fragmentary section of a shell support stand.
FIG. 16 is an enlarged section of a drive shaft connection to the main conveyor.
FIG. 17 is a fragmentary elevational view of a liquid supply header and spray nozzle.

The wheel mounting of the removable support structure 161 enables that entire subassembly to be withdrawn endwise from the process chamber. A support dolly 173 is shown underneath one end of this removable structure in FIG. 9 to illustrate its removal from the process chamber. Preliminary to this removal, the corresponding tunnel and transfer conveyor must be physically cleared from the path. The end cap 158 on the spool must be removed and the main conveyor 102 must be disengaged from its drive which is shown in FIGS. 6 and 16. In particular, the drive is shown as including a sprocket 174 carrying a fixed sleeve 175 to mount a shaft 176 for axial shifting movement for effecting engagement and disengagement with the drive roller of the conveyor. The limits of movement are determined by a pin 176P carried in the shaft and acting in sleeve slots 177S. When the shaft 176 is retracted, its socketed connection end is outboard of the removable support structure to provide required clearance for endwise shifting of the same. It will also be noted that the outboard mounted ducts 170 and 171 have flanged entry ways 170E and 171E at aach side at opposite ends to effect quick connection and disconnection with the ducts 157 and 156 in the spools. The headers 108U and 108L which receive the liquid nitrogen may also have a quick mechanical disconnection provision so that withdrawal of the equipment and cleaning is greatly facilitated.

Thus, while preferred constructional features of the invention are embodied in the structure illustrated herein, it is to be understood that changes and variations may be made by those skilled in the art without departing from the spirit and scope of the appended claims.

What is claimed is:

1. Apparatus for flash freezing of articles comprising housing means defining a substantially thermally isolated process chamber, means including a conveyor operating in said chamber for transporting articles in succession along a process path leading into, through and out of said chamber, liquid recirculation means including spray nozzle mechanism within the chamber for directing a spray discharge of cryogenic liquid against each article at one region along the process path to flash partly to gas, the liquid collector means underlying said one region to receive the liquid remaining from said discharge, means for supplying cryogenic liquid and including a source of cryogenic liquid for replacing liquid flashing to gas and connected to open directly into the chamber and liquid pumping means having an intake line communicating with the collector means to receive liquid therefrom and having a discharge line communicating with the spray nozzle mechanism to supply liquid thereto for spray discharge therefrom at a mass flow rate substantially greater than the mass rate of liquid flashing to gas within the chamber, and gas pumping means having a suction inlet and a discharge outlet communicating with spaced locations within the chamber to develop a high velocity gas stream traveling a recirculation flow path intersecting another region of the chamber.

2. Apparatus for flash freezing of articles comprising housing means defining a substantially thermally isolated process chamber, means including a conveyor operating in said chamber for transporting articles in succession along a process path leading into, through and out of said chamber, liquid recirculation means including spray nozzle mechanism within the chamber for directing a spray discharge of cryogenic liquid against each article at one region along the process path to flash partly to gas, the liquid collector means underlying said one region to receive the liquid remaining from said discharge and liquid pumping means and having an intake line communicating with the collector means to receive liquid therefrom and having a discharge line communicating with the spray nozzle mechanism to supply liquid thereto for spray discharge therefrom at a mass flow rate substantially greater than the mass rate of liquid flashing to gas within the chamber, and gas pumping means having a suction inlet and a discharge outlet communicating with spaced locations within the chamber to develop a high velocity gas stream traveling a recirculation flow path intersecting another region of the chamber.

3. Apparatus for flash freezing of articles comprising housing means defining a substantially thermally isolated process chamber, means including a conveyor operating in said chamber for transporting articles in succession along a process path leading into, through and out of said chamber, liquid recirculation means including spray nozzle mechanism within the chamber for directing a spray discharge of cryogenic liquid against each article at a downstream region along the process path to flash partly to gas, liquid collector means underlying said one region to receive the liquid remaining from said discharge and liquid pumping means having an intake line communicating with the collector means to receive liquid therefrom and having a discharge line communicating with the spray nozzle mechanism to supply liquid thereto for spray discharge therefrom at a mass flow rate substantially greater than the mass rate of liquid flashing to gas within the chamber, and gas pumping means having a suction inlet and a discharge outlet communicating with spaced locations within the chamber to develop a high velocity gas stream traveling a recirculation flow path intersecting an upstream region of the chamber.

4. Apparatus for flash freezing of articles comprising housing means defining a substantially thermally isolated process chamber, means including a conveyor operating in said chamber for transporting articles in succession along a process path leading into, through and out of said chamber, liquid recirculation means including spray nozzle mechanism within the chamber for directing a spray discharge of cryogenic liquid against each article at one region along the process path to flash partly to gas, liquid collector means underlying said one region to receive the liquid remaining from said discharge and liquid pumping means having an intake line communicating with the collector means to receive liquid therefrom and having a discharge line communicating with the spray nozzle mechanism to supply liquid thereto for spray discharge therefrom at a mass flow rate substantially greater than the mass rate of liquid flashing to gas within the chamber, and gas pumping means having a suction inlet and a dischrage outlet communicating with spaced locations within the chamber to develop a high velocity gas stream traveling a recirculation flow path intersecting another region of the chamber and having a mass flow rate substantially greater than the mass flow rate of liquid flashing to gas within said chamber.

5. Apparatus for flash freezing of articles comprising hollow housing structure defining an elongated substantially thermally isolated process chamber open endwise at one end, removable support srtucture extending lengthwise in said chamber and movably mounted therein by engagement internally with said housing structure to be shiftable endwise through said open end, means including a conveyor mounted on said removable support structure and operable in said chamber for transporting articles in succession along a process path leading into, through and out of said chamber, means including a header feeding an array of spray nozzles mounted on said removable support structure for directing a spray discharge of cryogenic liquid against each article at one region along said process path to flash at least partially to gas within said chamber, means including internal housings mounted on said removable support structure adjacent another lengthwise region of the conveyor and providing first and second plenum chambers having generally opposed openings bordering the process path, a liquid collector tray incorporated in said removable support structure to underlie the conveyor at the region of spray discharge, liquid recirculation apparatus external of said chamber and having an intake line communicating with liquid collected in said tray and a discharge line communicating with said header, and gas pumping means external of said chamber and having a suction line communicating with the first plenum chamber and a discharge line communicating with the second plenum chamber to develop a high velocity gas stream traveling along a recirculation flow path intersecting another region of the process path.

6. Apparatus for flash freezing of articles comprising hollow housing structure defining an elongated substantially thermally isolated process chamber open endwise at one end, removable support structure extending lengthwise in said chamber and movably mounted therein by wheeled engagement internally with said housing structure to be shiftable endwise through said open end, means including a conveyor mounted on said removable support structure and operable in said chamber for transporting articles in succession along a process path leading into, through and out of said chamber, means including a header feeding an array of spray nozzles mounted on said removable support srtucture for directing a spray discharge of cryogenic liquid against each article at one region along said process path to flash at least partially to gas within said chamber, means including internal housings mounted no said removable support structure adjacent another lengthwise region of the conveyor and providing first and second plenum chambers flanking the process path and having openings communicating with the chamber a liquid collector tray incorporated in said removable support structure to underlie the conveyor at the region of spray discharge, liquid recirculation apparatus external of said chamber and having an intake line communicating with liquid collected in said tray and a discharge line communicating with said header, and gas pumping means external of said chamber and having a suction line communicating with the first plenum chamber and a discharge line communicating with the second plenum chamber to develop a high velocity gas stream traveling along a recirculation flow path intersecting another region of the process path.

7. Apparatus for flash freezing of articles comprising hollow housing structure defining an elongated substantially thermally isolated process chamber open endwise at one end, said housing structure including a unitary inner shell subject to contraction and expansion in response to temperature variations in the process chamber, an outer shell substantially coextensive with and encircling the inner shell in spaced relation to define an annular space therebetween, said outer shell having an endless flexible joint intermediately therealong and having opposite end sections rigidly connected to corresponding portions of the inner shell to enable the outer shell to undergo lengthwise shifting follower movement in accordance with contraction and expansion of the inner shell, means for drawing vacuum in said space, and exterior mounts supporting the outer shell at locations on both sides of the joint to accommodate lengthwise shifting movement of the outer shell, removable support structure extending lengthwise in said chamber and movably mounted therein by internal engagement with said housing structure to be shiftable endwise through said open end, means including a conveyor mounted on said removable support structure and operating in said chamber for transporting articles in succession along a process path leading into, through and out of said chamber, means including a header feeding an array of spray nozzles mounted on said removable support structure for directing a spray discharge of cyrogenic liquid against each article at one region along said process path to flash at least partially to gas within said chamber, means including internal housings mounted on said removable support structure adjacent another lengthwise region of the conveyor and providing first and second plenum chambers flanking the process path and having openings communicating with the chamber, a liquid collector tray incorporated in said removable support structure to underlie the conveyor at the region of spray discharge, liquid recirculation apparatus external of said chamber and having an intake line communicating with liquid collected in said tray and a discharge line communicating with said spray discharge mechanism, and gas pumping means external of said chamber and having a suction line communicating with the first plenum chamber and a discharge line communicating with the second plenum chamber to develop a high velocity gas stream traveling along a recirculation flow path intersecting another region of the process path.

8. In apparatus for flash freezing of articles, hollow housing structure defining a substantially thermally isolated cryogenic process chamber and including substantially coextensive inner and outer telescoping shell structures defining an annular space therebetween, means for drawing vacuum in said space, a separate insulated connection spool at each end of said housing structure and joined to corresponding ends of said shell structures, spray nozzle mechanism mounted within said chamber for directing a spray discharge of cryogenic liquid against articles therein to flash at least partially to gas at one region within said chamber, means providing a suction inlet and a discharge outlet at spaced apart locations adjacent another region of said chamber for developing a directed high velocity gas stream on articles disposed between the discharge outlet and suction inlet, means adapted for connection to a source of cryogenic liquid external of the housing structure and including a feed line extending through one of said spools and connected to said spray nozzle mechanism, and gas pumping means external of the housing structure and having a positive pressure discharge line and a suction line both leading through one of said spools and connected to said discharge outlet and said suction inlet, respectively.

9. In apparatus for flash freezing of articles hollow housing structure defining a substantially thermally isolated cryogenic process chamber and including substantially coextensive inner and outer telescoping shell structures defining an annular space therebetween, means for drawing vacuum in said space, a separate insulated connection spool at each end of said housing structure and joined to corresponding ends of said shell structure, spray nozzle mechanism mounted within said chamber for directing a spray discharge of cryogenic liquid against articles therein to flash at least partially to gas at one region within said chamber, first means providing a suction inlet and a discharge outlet at transversely spaced apart locations adjacent another region of said chamber for developing a directed high velocity gas stream on articles disposed between the discharge outlet and suction inlet, second means providing a suction inlet and a discharge outlet at a transversely spaced apart locations adjacent a further region of said chamber for developing an oppositely directed high velocity gas stream on articles disposed between the last named discharge outlet and suction inlet, means adapted for connection to a supply of cryogenic liquid external of the housing structure and including a feed line extending through one of said spools and connected to said spray nozzle mechanism, first gas pumping means external of the housing structure and having a positive pressure discharge line and a suction line both leading through one of said spools and connected to said discharge outlet and said suction inlet, respectively, of said first means, and second gas pumping means external of the housing structure and having a positive pressure discharge line and a suction line both leading through the other of said spools and connected to said discharge outlet and said suction inlet, respectively, of said second means.

10. In apparatus for flash freezing of articles, hollow housing structure defining a substantially thermally isolated cryogenic process chamber and including a unitary inner shell subject to contraction and expansion in response to temperature variations in the process chamber, an outer shell substantially coextensive with and encircling the inner shell in spaced relation to define an annular space therebetween, said outer shell having an endless flexible joint intermediately therealong and having opposite end sections rigidly connected to corresponding portions of the inner shell to enable the outer shell to undergo lengthwise shifting follower movement, means for drawing vacuum in said space, a separate insulated connection spool at each end of said housing structure and joined to corresponding ends of said shell structures, exterior mounts supporting the outer shell at locations on both sides of the joint to accommodate lengthwise shifting movement of the outer shell, spray nozzle mechanism mounted within said chamber for directing a spray discharge of cryogenic liquid against articles therein to flash at least partially to gas at one region within said chamber, means providing a suction inlet and a discharge outlet at spaced apart locations adjacent another region of said chamber for developing a directed high velocity gas stream on articles disposed between the discharge outlet and suction inlet, means adapted for connection to a source of cryogenic liquid external of the housing structure and including a feed line extending through one of said spools and connected to said spray nozzle mechanism, and gas pumping means external of the housing structure and having a positive pressure discharge line and a suction line both leading through one of said spools and connected to said discharge outlet and said suction inlet, respectively.

11. In article freezing apparatus, hollow housing structure defining a substantially thermally isolated cryogenic process chamber and including substantially coextensive inner and outer telescoping shell structures defining an annular space therebetween, a separate insulated connection spool at each end of said housing structure and joined to corresponding ends of said shell structures, mechanism within said chamber for producing contact of cryogenic liquid with articles therein to flash the cryogenic liquid which contacts the articles at least partially to gas within said chamber, means including gas flow duct means and gas pumping means for developing a high velocity gas stream impinging on articles disposed in said chamber, said gas flow duct means extending through one of said spools and communicating interiorly with said chamber, and means adapted for connection to a source of cryogenic liquid external of the housing structure and including a liquid feed line extending through one of said spools and connected to said mechanism.

12. In apparatus for flash freezing of articles, said apparatus including insulated housing structure defining a substantially thermally isolated process chamber, means for transporting articles along a process path extending through said chamber and cooperating means for introducing cryogenic liquid into the chamber, converting the cryogenic liquid into relatively cold gas within the chamber and discharging relatively higher temperature gas from the chamber in a relationship to produce and maintain a freezing environment of gas in the chamber, said cooperating means including means for contacting cryogenic liquid with each article along a downstream path region in said chamber to vaporize and freshly generate cold gas in said chamber and means for developing a high velocity gas stream impinging on articles at an upstream process path region in said chamber, the improvement comprising spray nozzle mechanism in said chamber oriented to direct a spray discharge towards each article at said downstream process path region, and means for pressure feeding cryogenic liquid to said spray nozzle mechanism to maintain a pressurized spray dischrage impinging upon said articles at a mass flow rate to have the cryogenic liquid that contacts each article only partly flash to cryogenic gas and including means for supplying make-up cryogenic liquid to said apparatus at a rate to replace cryogenic liquid flashing to gas, collector means for receiving excess cryogenic liquid from said articles, and means for repressurizing and feeding the collected excess cryogenic liquid to said spray nozzle mechanism.

13. In apparatus in accordance with claim 12 and wherein said collector means is within said chamber underlying said downstream path region, and said repressurizing means includes liquid pumping means having an intake line receiving liquid from said collector means and having a discharge line communicating with the spray nozzle mechanism.

14. In apparatus in accordance with claim 12 and wherein said collector means is within said chamber underlying said downstream path region and said repressurizing means includes reservoir means external of said chamber, a drain line leading from said collector means to said reservoir means and liquid pumping means having an intake communicating with liquid in said reservoir means and having a discharge line communicating with the spray nozzle mechanism.

15. In apparatus in accordance with claim 12 and wherein said spray nozzle mechanism includes spray nozzles positioned above said downstream path region and directed generally downwardly and spray nozzles positioned below said downstream path region and directed generally upwardly.

16. In apparatus in accordance with claim 12 wherein said spray discharge mechanism produces a spray discharge pattern along a region about ⅓ of the length of the process chamber and said gas stream flows along the remainder of the length of the process chamber.

17. In apparatus in accordance with claim 12 wherein said spray discharge mechanism includes wide angle spray nozzles having orifices of about ⅛ inch diameter and wherein said pressure feeding means supplies cryogenic liquid to said nozzles at a pressure of about 6 p.s.i.

18. In apparatus in accordance with claim 12 wherein said spray discharge mechanism is sized and supplied with pressurized liquid such that a discharge spray pattern that is produced is characterized by a deposit of atomized liquid droplets substantially uniformly on the exposed region of each article, said spray pattern being similar to that produced by a wide angle spray nozzle having an orifice of about ⅛ inch in diameter and supplied with liquid at a pressure of about 6 p.s.i.

19. In apparatus in accordance with claim 18 wherein said spray nozzle mechanism includes spray nozzles positioned above said downstream path region and directed generally downwardly and spray nozzles positioned below said downstream path region and directed generally upwardly, said spray discharge mechanism producing a spray discharge pattern distributed along said downstream path region to span about ⅓ of the length of the process chamber, with said gas stream flowing along the remainder of the length of the process chamber.

20. In a system of flash freezing articles in a substantially thermally isolated chamber and including the steps of introducing cryogenic liquid into the chamber, converting the cryogenic liquid into cryogenic gas within the chamber by contacting the cryogenic liquid with the articles, discharging the cryogenic gas from the chamber in a relationship to produce and maintain an environment of cryogenic gas along a process path within the chamber through which path the articles to be frozen must travel, and transporting the articles to be frozen along the process path and while such articles are along said path contacting each article with a continuously moving high velocity stream of said cryogenic gas having a mass flow rate substantially greater than the mass rate of vaporization of cryogenic liquid in the chamber, the improvement comprising converting the cryogenic liquid into cryogenic gas by impinging a pressurized spray discharge of cryogenic liquid against the articles at a mass flow rate substantially greater than the mass rate of vaporization of cryogenic liquid in the chamber to have the cryogenic liquid that contacts each article flash only partly to gas, and maintaining said pressurized spray discharge by adding make-up cryogenic liquid to the system at a rate to replace the cryogenic liquid flashing to gas and collecting and recirculating excess cryogenic liquid after article contact thereof.

21. In a system in accordance with claim 20, and wherein the pressurized spray discharge consists of a portion directed generally downwardly from above the articles and a portion directed generally upwardly from below the articles.

22. In a system of flash freezing articles in a substantially thermally isolated chamber and including the steps of introducing cryogenic liquid into the chamber, converting the cryogenic liquid into cryogenic gas within the chamber by contacting the cryogenic liquid with the articles, discharging the cryogenic gas from the chamber in a relationship to produce and maintain an environment of cryogenic gas along a process path within the chamber through which path the articles to be frozen must travel, and transporting the articles to be frozen along the process path and while such articles are along said path contacting each article with a continuously moving stream of commingled gases comprised partly of gas freshly generated within the chamber by vaporization of cryogenic liquid by article contact therein and partly of gas reclaimed after previous article contacting travel, said stream of commingled gases having a mass flow rate substantially greater than the mass rate of vaporization of cryogenic liquid in the chamber, the improvement comprising converting the cryogenic liquid into cryogenic gas by impinging a pressurized spray discharge of commingled cryogenic liquid against the articles at a mass flow rate substantially greater than the mass rate of vaporization of cryogenic liquid in the chamber to have the commingled cryogenic liquid that contacts each article flash only partly to gas, the commingled cryogenic liquid being comprised partly of liquid nitrogen reclaimed after previous article contacting spray discharge and partly of make-up cryogenic liquid added to the system to replace the cryogenic liquid that vaporizes.

23. In a system in accordance with claim 22 wherein make-up cryogenic liquid is fed directly into the chamber and wherein the pressurized spray discharge consists of a portion directed generally downwardly from above the articles and a portion directed generally upwardly from below the articles.

24. The method of flash freezing articles in a substantially thermally isolated chamber including the steps of transporting each article along a process path leading into, through and out of the chamber, pressure feeding cryogenic liquid into the chamber to maintain a pressurized spray discharge of cryogenic liquid impinging upon said articles at a downstream process path region at a mass flow rate to have the cryogenic liquid that contacts each article only partly flash to cryogenic gas, said pressure feeding of cryogenic liquid including pressure feeding make-up cryogenic liquid directly into the chamber at a rate to replace the cryogenic liquid vaporizing in the chamber, collecting excess cryogenic liquid in the chamber and repressurizing and supplying the collected cryogenic liquid for spray discharge, maintaining a high velocity stream of said cryogenic gas at an upstream process path region in said chamber to impinge on said articles at a mass flow rate substantially greater than the mass rate of vaporization of cryogenic liquid in the chamber.

25. The method of flash freezing articles in a substantially thermally isolated chamber including the steps of transporting each article along a process path leading into, through and out of the chamber, pressure feeding cryogenic liquid into the chamber to maintain a pressurized spray discharge of cryogenic liquid impinging upon said articles at a downstream process path region at a mass flow rate to have the cryogenic liquid that contacts each article only partly flash to cryogenic gas, and maintaining a high velocity stream of said cryogenic gas at an upstream process path region in said chamber to impinge on said articles at a mass flow rate substantially greater than the mass rate of vaporization of cryogenic liquid in the chamber, said pressure feeding of cryogenic liquid being provided by maintaining a reservoir of cryogenic liquid, adding make-up cryogenic liquid at a rate to replace the cryogenic liquid flashing to gas, collecting and feeding excess cryogenic liquid in said chamber to said reservoir, repressurizing cryogenic liquid from said reservoir and feeding the repressurized cryogenic liquid to be liquid spray discharged into said chamber.

26. In a system in accordance with claim 20 and wherein said spray discharge is applied to effect liquid contact over a downstream process path region of about ⅓ the length of the process chamber and said high velocity stream of gas is applied to effect gas contact over an upstream process path region of about ⅔ the length of the process chamber.

References Cited

UNITED STATES PATENTS

| | | | |
|---|---|---|---|
| 2,898,384 | 8/1959 | Viriot | 165—81 X |
| 3,028,855 | 4/1962 | Brown | 165—81 X |
| 3,255,608 | 6/1966 | Macintosh | 62—380 X |
| 3,277,657 | 10/1966 | Harper et al. | 62—64 X |
| 3,287,932 | 11/1966 | Schlemmer | 62—65 X |
| 3,345,828 | 10/1967 | Klee et al. | 62—63 |

EDWARD J. MICHAEL, *Primary Examiner.*

U.S. Cl. X.R.

62—64, 266, 325, 380